US00RE44357E

(19) United States
(12) Reissued Patent
Schmutz

(10) Patent Number: US RE44,357 E
(45) Date of Reissued Patent: Jul. 9, 2013

(54) DISCRETE POWER LEVEL CODING FOR INDICATING UPLINK MOBILE RECEIVE LEVEL IN A WIRELESS REPEATER SYSTEM

(75) Inventor: Thomas Schmutz, Sarasota, FL (US)

(73) Assignee: Treble Investments Limited Liability Company, Wilmington, DE (US)

(21) Appl. No.: 12/058,381

(22) Filed: Mar. 28, 2008

Related U.S. Patent Documents

Reissue of:
(64) Patent No.: 7,020,436
Issued: Mar. 28, 2006
Appl. No.: 09/749,210
Filed: Dec. 27, 2000

U.S. Applications:
(60) Provisional application No. 60/173,541, filed on Dec. 29, 1999.

(51) Int. Cl.
*H04B 1/60* (2006.01)
*H04B 17/02* (2006.01)

(52) U.S. Cl.
USPC ..... 455/9; 455/11.1; 455/522; 455/25

(58) Field of Classification Search
USPC ..... 455/11.1, 9, 13.1, 13.414, 15, 16, 455/24, 522, 69, 25, 67.11, 13.4, 14, 18, 455/436
See application file for complete search history.

(56) References Cited

U.S. PATENT DOCUMENTS 4,794,649 A 12/1988 Fujiwara
5,023,930 A * 6/1991 Leslie ..... 455/9
5,479,400 A 12/1995 Dilworth et al.
5,832,365 A 11/1998 Chen et al.
5,890,055 A 3/1999 Chu et al.
5,970,410 A 10/1999 Carney et al.
6,009,324 A 12/1999 Pravitz et al.
6,088,570 A 7/2000 Komara et al.
6,147,981 A 11/2000 Prescott
6,269,250 B1 * 7/2001 Bender et al. ..... 455/522
6,377,612 B1 * 4/2002 Baker ..... 375/141
6,469,984 B1 10/2002 Baker
6,590,881 B1 7/2003 Wallace et al.
6,615,021 B1 9/2003 Lovinggood et al.
6,647,244 B1 11/2003 Haymond et al.
6,704,298 B1 3/2004 Matsumiya et al.

OTHER PUBLICATIONS

USPTO; Office Action dated May 16, 2011 in U.S. Appl. No. 12/122,251.
USPTO; Office Action Restriction dated Mar. 24, 2011 in U.S. Appl. No. 12/122,251.

* cited by examiner

*Primary Examiner* — John J Lee
(74) *Attorney, Agent, or Firm* — Brundidge & Stanger, P.C.

(57) ABSTRACT

A method for managing a plurality of mobile units in a wireless cellular communication system having a plurality of repeater stations includes the step of receiving a signal on an uplink communication channel from a mobile transceiver unit at one of the repeaters. The method also measures at the repeater station a power level of the signal as received by the repeater station. The method further includes the step of transmitting a backhaul signal from the repeater station to the base transceiver station on a backhaul communication link, where the backhaul signal is transmitted at one of a plurality of discrete power levels providing an indication of the power level as measured by the repeater station.

40 Claims, 6 Drawing Sheets

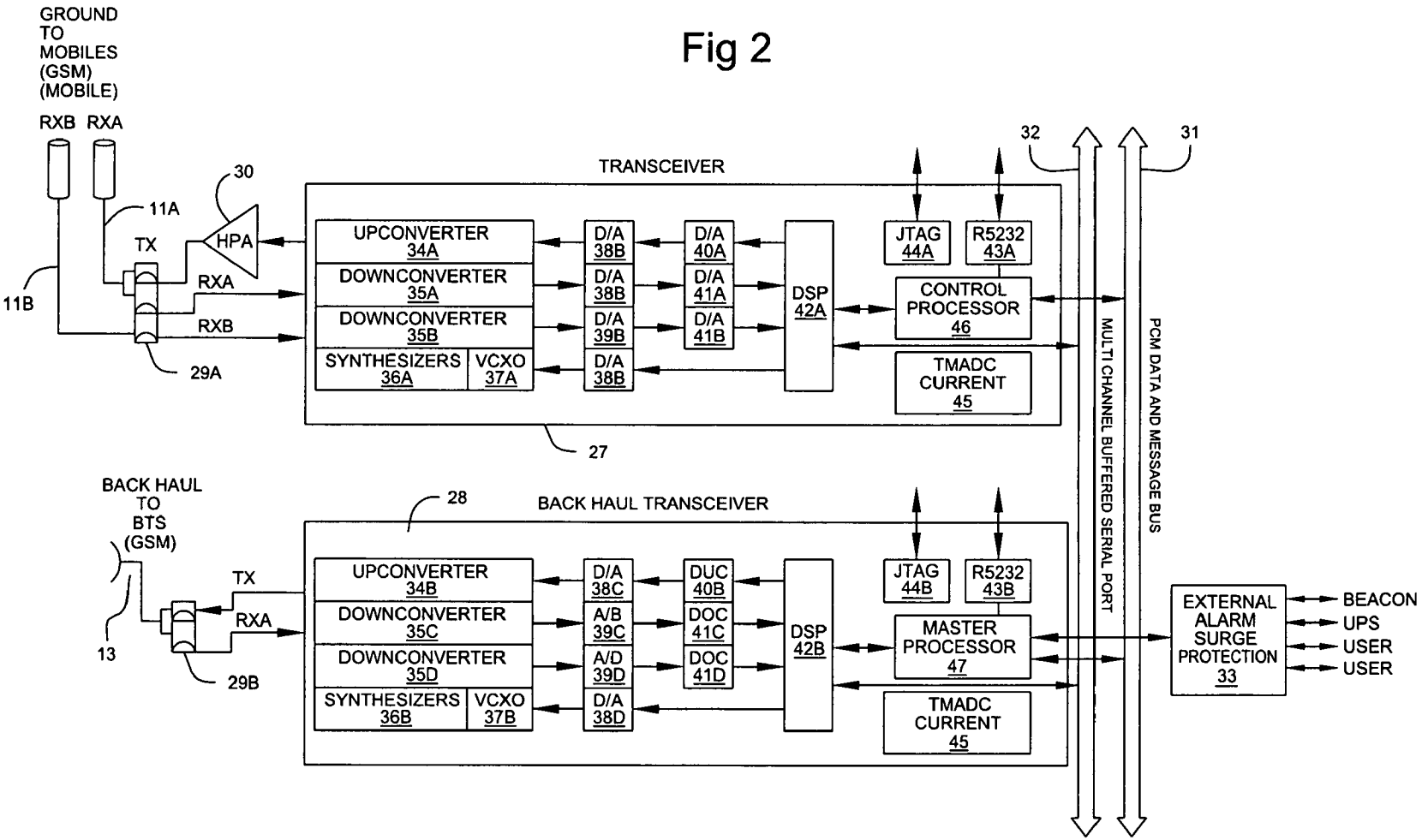
Fig 2
BEACON
UPS
USER
USER
EXTERNAL ALARM SURGE PROTECTION 33
31
PCM DATA AND MESSAGE BUS
MULTI CHANNEL BUFFERED SERIAL PORT
32
TRANSCEIVER
JTAG 44A
R5232 43A
CONTROL PROCESSOR 46
TMADC CURRENT 45
DSP 42A
D/A 40A
D/A 41A
D/A 41B
D/A 38B
D/A 38B
D/A 39B
D/A 38B
UPCONVERTER 34A
DOWNCONVERTER 35A
DOWNCONVERTER 35B
SYNTHESIZERS 36A
VCXO 37A
27
BACK HAUL TRANSCEIVER
JTAG 44B
R5232 43B
MASTER PROCESSOR 47
TMADC CURRENT 45
DSP 42B
DUC 40B
DOC 41C
DOC 41D
D/A 38C
A/B 39C
A/D 39D
D/A 38D
UPCONVERTER 34B
DOWNCONVERTER 35C
DOWNCONVERTER 35D
SYNTHESIZERS 36B
VCXO 37B
28
30
HPA
RXA
RXB
29A
11A
TX
GROUND TO MOBILES (GSM) (MOBILE)
RXA
RXB
11B
TX
RXA
29B
BACK HAUL TO BTS (GSM)
13

FIG. 6

| MEASURED INPUT POWER LEVEL (dBm) | PREDETERMINED OUTPUT POWER LEVEL (dBm) |
|---|---|
| -25 TO -40 | -64 |
| -41 TO -55 | -66 |
| -56 TO -65 | -68 |
| -66 TO -75 | -70 |
| -76 TO -90 | -72 |
| -91 TO -111 | -74 |

FIG. 7

| MEASURED INPUT POWER (dBm) | PREDETERMINED OUTPUT LEVEL (dBm) AS MEASURED AT BTS RECEIVER | INSTRUCTIONS TO MOBILE |
|---|---|---|
| -25 TO -65 | -70 (POWER LEVEL 1) | LOWER POWER LEVEL |
| -65 TO -75 | -80 (POWER LEVEL 2) | MAINTAIN POWER LEVEL |
| -75 TO -105 | -90 (POWER LEVEL 3) | BOOST POWER LEVEL |
| -105 TO -111 | -100 (POWER LEVEL 4) | PREPARE FOR HANDOFF |

DISCRETE POWER LEVEL CODING FOR INDICATING UPLINK MOBILE RECEIVE LEVEL IN A WIRELESS REPEATER SYSTEM

Matter enclosed in heavy brackets [ ] appears in the original patent but forms no part of this reissue specification; matter printed in italics indicates the additions made by reissue.

CROSS REFERENCE TO RELATED APPLICATIONS

This application is related to and claims priority to U.S. Provisional Application No. 60/173,541 entitled "Discrete Backhaul Power Transmission From a Translating Repeater to Indicate Uplink Mobile Receive Level" filed Dec. 29$^{th}$, 1999, the entirety of which is hereby incorporated by reference.

BACKGROUND OF THE INVENTION

1. Field of the Invention

The instant invention pertains generally to the field of wireless cellular communication. More particularly, the invention describes a method and apparatus for automatically controlling power level in a backhaul channel of a wireless cellular repeater system.

2. Description of Related Art

In wireless cellular communication systems, it is desirable for a base transceiver station (BTS) to have an indication of the received mobile unit power levels on all the channels in the system at all times. Such information permits the BTS to effectively manage the mobile transceiver units, repeater stations and the home base stations, including actions such as handoff. In repeater based wireless cellular communications systems, any power level measurements for the channels in the system are at best mere approximations.

The reason for such approximations is that in wireless cellular communication systems having repeaters, the signal from the mobile stations is first received by the repeater station. These repeater stations typically have automatic level control (ALC) circuitry that may attenuate or boost the received signal power level to ensure that the signal transmitted by the repeater is received by the serving home base station at a sufficient power level. The ALC alters the characteristics of the received signal including important information such as the received power level. For example, the ALC may cause the power level of the backhaul signal transmitted from the repeater to the base station to be a non-linear function relative to the power received from the mobile units. More specifically, power received from a mobile unit at the repeater station in the range from −25 dBm to −65 dBm would be re-transmitted at −62 dBm in an existing system. In other instances, the ALC may cause the power level of the backhaul signal transmitted from the repeater station to the base station to be compressed in certain power ranges into a ratio of 2:1 for example. More specifically, power received from a mobile unit at the repeater station in the range from −65 to −105 dBm would be re-transmitted at −62 to −82 dBm in an existing system. Under this scenario, a repeater station is difficult to calibrate, test and install.

One of the consequences of automatic level control is that the power level of the signal that is transmitted from the mobile transceiver station to the repeater station is not necessarily correlated to the signal level that is transmitted from the repeater station to the serving home base station. This is because the home base station only receives signal power level information pertaining to the signal that is modified by the ALC in the repeater station. As a result, any indication of the signal power level that the home base station sends to the managing base station controller will not necessarily be an accurate representation of the actual signal power level of the mobile transceiver station or pilot signal from an unused channel. Even if a linear correlation is established between the power level received at the repeater and the corresponding power level received at the base transceiver station, this would still require strict installation procedures and precise backhaul signal configurations to ensure proper power control and handoff functions. There is not much margin for error or tolerance given in such installations. Accordingly, there has been a need to provide a more effective solution to the problem of controlling a wireless cellular communication system having one or more repeaters that would allow for less stringent installation procedures and less performance variations due to radio frequency component characteristics.

SUMMARY OF THE INVENTION

In a first aspect of the present invention, a method for managing a plurality of mobile transceiver units in a wireless cellular communication system having a base transceiver station located within a home cell and a plurality of substantially adjacent cells each having a repeater located therein comprises the steps of receiving at one of said repeaters, a signal from a mobile transceiver unit on an uplink communication channel, measuring at said repeater a power level of said signal as received by said repeater, and transmitting a backhaul signal from said repeater to said base transceiver station on a backhaul communication link, wherein said backhaul signal is transmitted at one of a plurality of discrete power levels providing an indication of said power level as measured by said repeater.

In another aspect of the present invention, a repeater in a wireless cellular communication system comprises a receiver for receiving a signal from a mobile transceiver unit via an uplink communication channel, power measurement means for measuring a power level of said signal as received by said repeater, and a transmitter for transmitting a backhaul signal from the repeater to the base transceiver station via a backhaul communication link. Preferably, the backhaul signal is transmitted at one of a plurality of discrete power levels providing an indication of the power level from the mobile transceiver as measured by said repeater In yet another aspect of the present invention, a configurable base transceiver station in a communication system having the base transceiver station located within a home cell and a plurality of substantially adjacent cells each having a repeater located therein comprises a transmitter for transmitting traffic and control signals to the repeater, a receiver for receiving a backhaul signal from the repeater, and a processor that is programmed to selectively configure the plurality of discrete power levels at which the repeater will transmit the backhaul signal. The backhaul signal is transmitted at one of a plurality of discrete power levels indicative of a power level measured from an uplink communication channel at the repeater.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 2 is a block diagram of an exemplary translator repeater station of the type shown in the wireless communication system of FIG. 1.

FIG. 6 is a chart illustrating an exemplary measured input power level received at a repeater and a corresponding predetermined output power level received at a base transceiver station in accordance with the present invention.

FIG. 7 is another chart illustrating an exemplary measured input power level received at a repeater and a corresponding predetermined output power level received at a base transceiver station along with respective instructions to the mobile transceiver unit in accordance with the present invention.

DETAILED DESCRIPTION OF THE INVENTION

Figure 1:
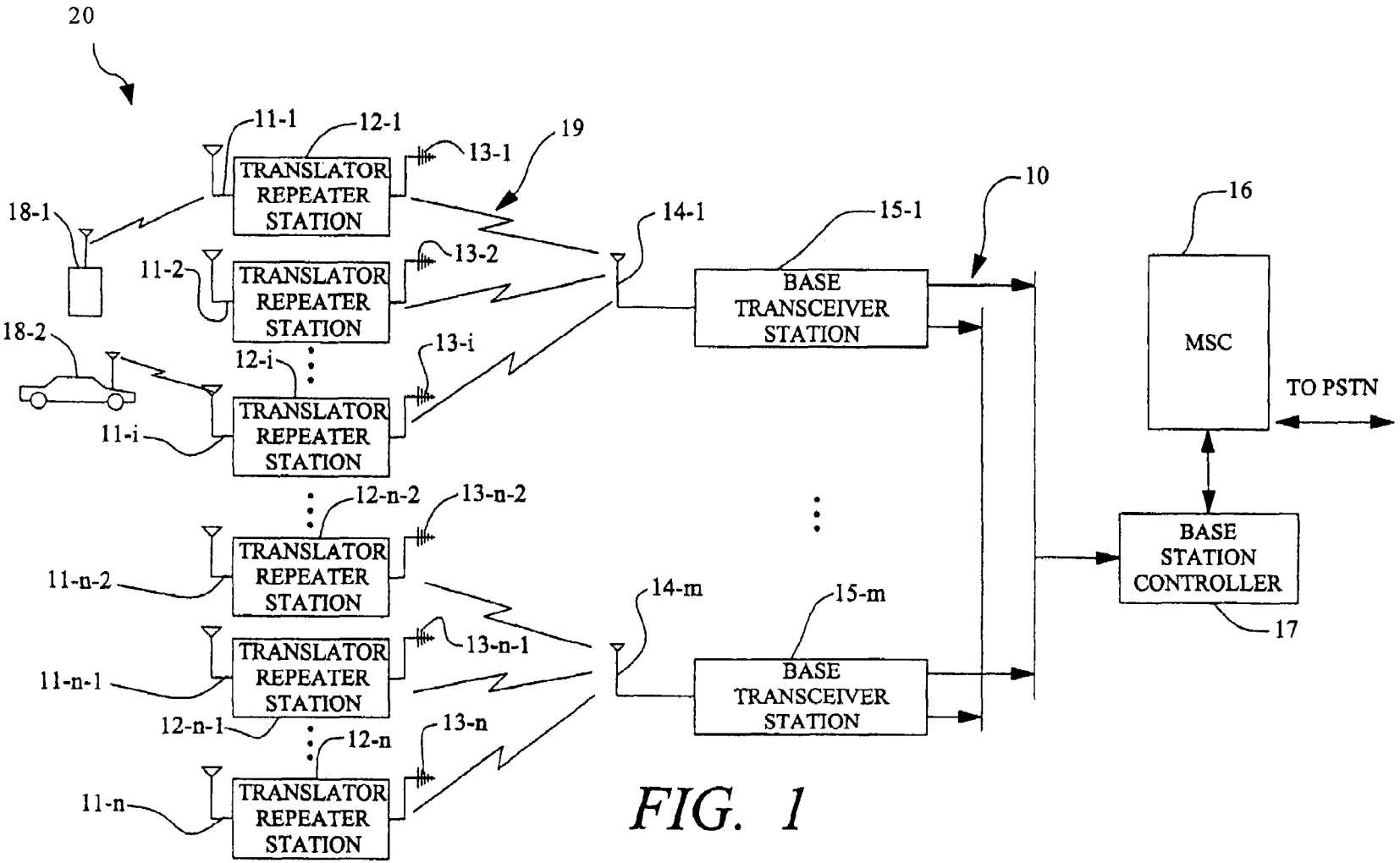
FIG. 1 is a block diagram of a wireless communications system employing wireless translator/repeater stations in accordance with the present invention.

FIG. 1 is a block diagram of a wireless communications system such as a Personal Communication System ("PCS") or other similar system in accordance. In this system, single-omni type wireless translators/repeaters are deployed in peripheral cells of a cell cluster to concentrate radio signal traffic to and from a broadband base transceiver station ("BTS"). Those skilled in the art will readily appreciate that sectorized wireless translators can also be used for this purpose. However, for convenience, the system will first be described relative to the single-omni type translator/repeater system.

The system 10 can include translator omni-directional antennas 11-1, 11-2, . . . 11-i, . . . 11-n−2, 11-n−1 and 11-n (collectively omni-directional antennas 11), translator base stations 12-1, 12-2, . . . 12-i, . . . 12-n−2, 12-n−1 and 12-n (collectively repeaters 12), translator directional antennas 13-1, 13-2, . . . 13-i, . . . 13-n−2, 13-n−1 and 13-n (collectively repeater directional antennas 13), BTS directional antennas 14-1, . . . 14-m (collectively BTS antennas 14), and broadband base transceiver stations 15-1, . . . 15-m (collectively BTSs 15). System 10 can further include mobile telephone exchange 16, one or more base station controllers 17 and a plurality of mobile subscriber units 18-1 and 18-2 (collectively mobile units 18).

Repeaters 12 conventionally receive radio signals from mobile units 18 through omni-directional antennas 11 and forward them to BTS's 15 through repeater directional antennas 13. Likewise, radio signals transmitted from BTS's 15 through BTS antennas 14 are forwarded by repeater 12 to mobile units 18. BTS's 15 are responsible for demodulating signals received from repeaters 12 through BTS antennas 14 and connecting these signals to the Public Switched Telephone Network (PSTN) through mobile telephone exchange 16. In addition, BTS's 15 modulate signals received from the PSTN through mobile switching center 16 to format them for transmission through BTS antennas 14 to repeaters 12.

Operationally, repeater 12 transmits signals to and receives signals from BTS 15 through backhaul channel 19. Similarly, repeater 12 transmits signals to and receives signals from mobile unit 18 through ground link channel 20. Each of the ground link channel 20 and the backhaul channel 19 is defined by an uplink carrier frequency and a downlink carrier frequency. Because BTS 15 is stationary, repeater 12 preferably employs directional antenna 13 to transmit and receive signals over backhaul channel 19. In contrast, because mobile units 18 are not stationary and the repeater is not sectorized, repeater 12 preferably employs one or more omni-directional antennas 11 to transmit and receive signals over ground link channel 20.

Communications between mobile units 18, repeaters 12, and BTS 15 can be performed using a variety of multiplexing schemes that are well known in the art. For example, a time division multiplex (TDM) scheme may be used for this purpose.

FIG. 2 is a detailed block diagram block of a repeater 12 that can be used in connection with the present invention. The repeater 12 can comprise a ground sector transceiver 27 and backhaul transceiver 28. It will readily be appreciated by those skilled in the art that other types of transceiver architectures may be used to practice the invention and the particular transceiver architecture as described herein is not intended be a limitation on the invention.

In a preferred embodiment, transceivers 27 and 28 are each capable of transmitting and receiving over a broad range of carrier frequencies allocated to a service provider for multi-carrier operation. However, the invention is not limited in this regard and more narrowbanded transceivers can also be used for the purposes of the present invention. Each transceiver 27, 28 is preferably configured so that its operation can be controlled by microprocessors 46 and 47, respectively.

FIG. 2 shows a single sector omni-type wireless repeater system, it being understood that the invention is not so limited. In fact, a variety of sectorized translation repeaters can also be used for this purpose. Signals from a mobile unit 18 are received at omni-directional antennas 11A and/or 11B attached to ground sector transceiver 27. These signals are encoded and transmitted by mobile unit 18 using a standard wireless telephony format such as GSM and typically range in power from between about −111 to −25 dBm. The signal passes through cavity filter 29A on to downconverter 35A or, alternatively, 35B where, in conjunction with synthesizer module 36A and voltage-controlled crystal oscillator 37A, the signal is mixed down to intermediate frequency or IF. A high-speed analog-to-digital converter 39A (or 39B) then converts the analog IF signal into a digital signal. Once the IF signal is digitized, digital downconverter 41A (or 41B) translates the signal down to complex baseband. Digital downconverter 41 preferably provides the ability to down-convert, decimate, filter and control the gain of the signal. After being converted to complex baseband, the signal is demodulated by digital signal processor 42A. Digital signal processor 42A is configured for decoding the received signal data from the standard wireless telephony format, such as GSM, to a common format used internally within the translator.

The common format data is then transferred to digital signal processor 42B in the backhaul transceiver 28 over multi-channel buffered serial port 32. Subsequently, the signal is re-modulated by digital signal processor 42B. The re-modulated signal is output as a complex baseband signal and translated to real IF by digital upconverter 40B. After the signal is translated to real IF, digital-to-analog converter 38C converts the signal back to an analog signal where it is mixed by upconverter 34B in conjunction with synthesizer module 36B and voltage-controlled crystal oscillator 37B. Now ready to be broadcast, the signal passes through cavity filter 29B and is transmitted through the backhaul channel to the BTS 15 through repeater directional antenna 13.

The transceivers 27 and 28 are preferably controlled by one or more control circuits. The control circuits can be in the form of a general purpose computer interfaced with the transceiver, a programmable microprocessor integrated with the transceivers with appropriate software, a hardware based controller, or any other combination of microprocessors, electronic circuitry and programming as may be necessary or appropriate for controlling the first and second transceivers.

As shown in FIG. 2, the control circuits include master processor 47 and control processor 46. Master processor 47 preferably controls the operation of backhaul transceiver 28, including selection of transmit and receive frequencies. Master processor 47 is also linked with PCM data and message bus 31 so that it can communicate with control processor 46, and vice versa. Control processor 46 is preferably a slave processor controlled by master processor 47. Control processor 46 can also preferably control the operation of ground sector transceiver 27, including selection of transceiver receive and transmit frequencies.

Translation of the signals transmitted from the BTS 15 through the backhaul channel is similar to the procedure employed to translate signals transmitted from the mobile units 18. Specifically, a signal, preferably at −70 dBm but typically ranging anywhere from −111 dBm to −25 dBm, is received from a BTS 15 at repeater directional antenna 13 attached to backhaul transceiver 28. The signal passes through cavity filter 29B to down converter 35C where, in conjunction with synthesizer module 36B and voltage-controlled crystal oscillator 37B, the signal is mixed down to IF. Analog-to-digital converter 39C converts the analog IF signal to a digital signal where it is subsequently processed by digital downconverter 41C to complex baseband. The receive channel consisting of downconverters 35D, A/D 39D and DDC 41D are not necessarily used in this embodiment of the invention.

Once converted into complex baseband, the signal is demodulated by digital signal processor 42B and transferred to digital signal processor 42A over multi-channel buffered serial port 32. The signal is then re-modulated by digital signal processor 42A and translated from complex baseband to real IF by digital upconverter 40A. After the signal is translated to real IF, digital-to-analog converter 38A converts the signal back to an analog signal. Upconverter 34A, synthesizer 36A, and voltage-controlled crystal oscillator 37A operate together to mix the signal for transmission. The signal is then amplified by high-power amplifier 30, filtered by cavity filter 29A and transmitted from omni-directional antenna 11A to the mobile unit 18 through the ground link channel 20.

Figure 3:
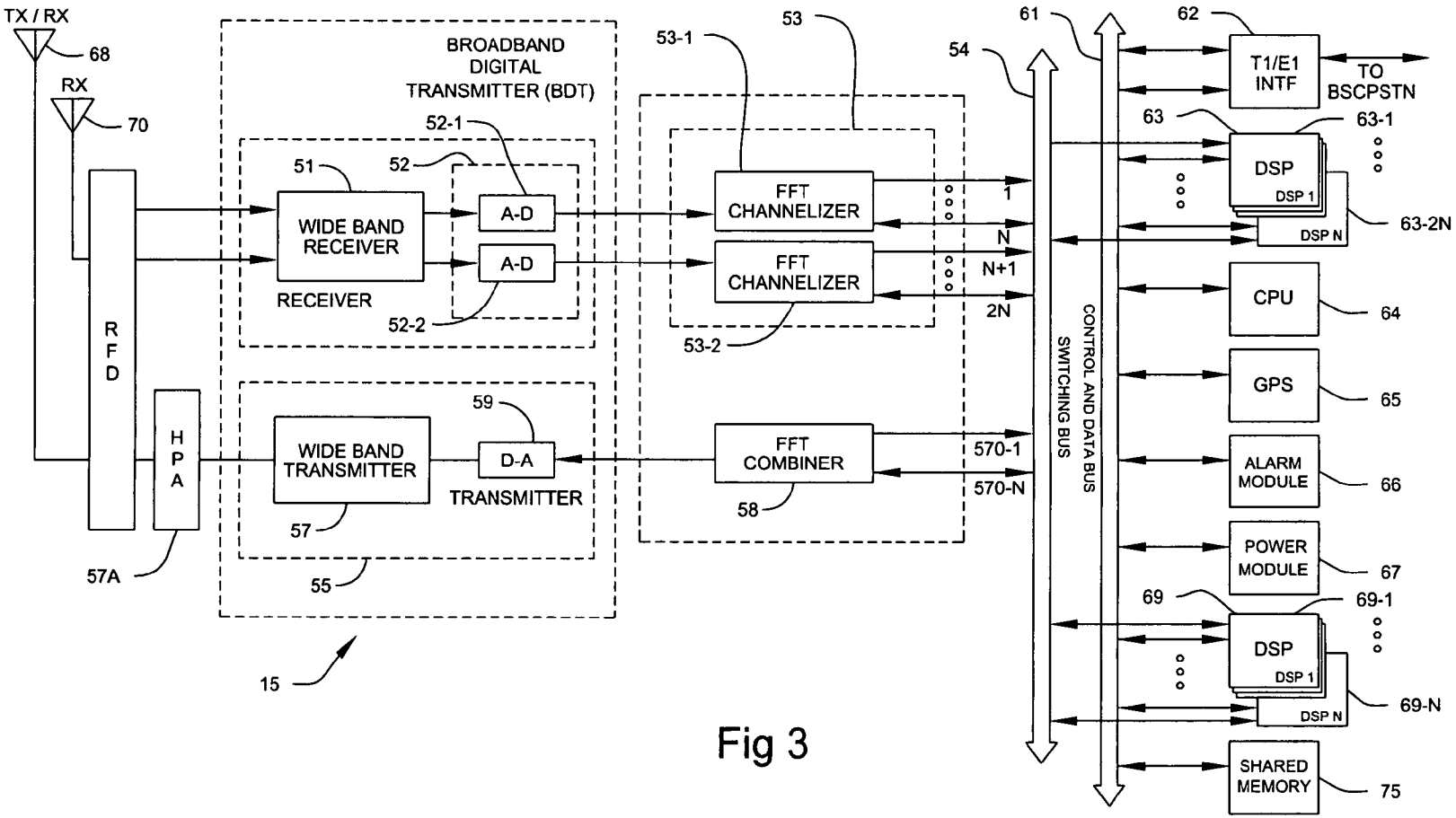
FIG. 3 is a block diagram of an exemplary base transceiver station of the type shown in the wireless communication system of FIG. 1.

Referring now to FIG. 3, a broadband BTS 15 is illustrated, which comprises a receiver section 56 and a transmitter section 55. It will be readily appreciated by those skilled in the art that the particular transceiver architecture shown is not critical. Accordingly, the invention disclosed herein is not intended to be so limited. Receiver section 56 preferably includes antennas 68, 70 and a wideband receiver 51 capable of receiving a plurality of carrier frequency channels. Signals from the received channels can include new power requests, power adjustment requests and traffic channel data from mobile transceiver units. The term "wide-band" as used herein, is not limited to any particular spectral range, and it should be understood to imply a spectral coverage of multiple frequency channels within the communication range over which a wireless communication system may operate (e.g. 60 MHZ). Narrowband, on the other hand, implies a much smaller portion of the spectrum, for example, the width of an individual channel (e.g. 200 kHz).

The output of the wideband receiver 51 is down-converted into a multi-channel baseband signal that preferably contains the contents of all of the voice/data carrier frequency channels currently operative in the communication system or network of interest. This multichannel baseband signal is preferably coupled to high speed A-D converters 52-1 and 52-2 operating in parallel for diversity receive capability. Where no diversity capability is required, a single A-D 52-1 could be utilized. Additionally, more than one parallel leg may be required for sectorized applications. Hence, it should readily be appreciated by one skilled in the art that the presence of a second parallel processing leg is not intended to be a limitation on the instant invention. The dynamic range and sampling rate capabilities of the A-D converter are sufficiently high (e.g. the sampling rate may be on the order of 25 Mega-samples per second (Msps)) to enable downstream digital signal processing (DSP) components, including Discrete Fourier Transform (DFT) channelizers 53-1 and 53-2, to process and output each of the active channels received by receiver 56.

The channelized outputs from the A-D converters are further processed to extract the individual channel components for each of the parallel streams. FFT channelizers 53-1 and 53-2 extract from the composite digitized multichannel signals, respective narrowband carrier frequency channel signals. These narrowband signals are representative of the contents of each of the respective individual carrier frequency communication channels received by the wideband receiver 51. The respective carrier frequency channel signals are coupled via N output links through a common data bus 61 to respective digital signal processing receiver units 63-1 & 63-2N, each of which demodulates the received signal and performs any associated error correction processing embedded in the modulated signal. In the case where the received signals are destined for the PSTN, these demodulated signals derived from the digital signal processing receiver units 63 can be sent via a common shared bus 54 to a telephony carrier interface, for example, T1 carrier digital interface 62, of an attendant telephony network (not shown).

The transmitter section 55 includes a second plurality of digital signal processing units, specifically, transmitter digital signal processing units 69-1 . . . 69-N, that are coupled to receive from the telephony network respective ones of a plurality of channels containing digital voice/data communication signals to be transmitted over respectively different individual carrier frequency channels of the multichannel network. Transmitter digital signal processing units 69 modulate and perform pre-transmission error correction processing on respective ones of the plurality of incoming communication signals, and supply processed carrier frequency channel signals over the common bus 54 to respective input ports of an inverse FFT-based multichannel combiner unit 58. The combiner 58 outputs a composite multichannel digital signal. This composite signal is representative of the contents of a wideband signal that contains the respective narrowband carrier frequency channel signals output from the digital signal processing transmitter units 69. A composite signal generated from the output of the multichannel combiner unit 58 is then processed by the digital-to-analog (D-A) converter 59. The output of D-A converter 59 is coupled to a wideband (multichannel) transmitter unit 57, which can include or have a separate multichannel high power amplifier (HPA) 57A. The transmitter unit 57 transmits a wideband (multichannel) communication channel signal defined by the composite signal output of the inverse fast Fourier transform-based combiner unit 58. The output of the HPA 57A is then coupled to antenna 68 for transmission.

A central processing unit (CPU) controller 64 is provided for coordinating and controlling the operation of BTS 15. For example, the CPU 64 can include a control processing unit, memory and suitable programming for responding to transmit power control requests received from mobile transceiver units. CPU 64 can selectively control transmit power levels of each TDM communication channels on a timeslot-by-timeslot basis. The CPU 64 may be a microprocessor, DSP processor, or micro controller having firmware, software or any combination thereof.

DSPs 63 can extract information from each of the narrowband carrier frequency channel signals. Information for each of these channels can be stored in shared memory 75 through the common control and data bus 61. CPU 64, under firmware and/or software control, can then access the shared memory 75 through bus 61.

The BTS 15 is ideally a configurable base transceiver station having a transmitter for transmitting traffic and control signals to the repeater 12 and a receiver for receiving a backhaul signal from the repeater 12. As previously described, the backhaul signal is transmitted at one of a plurality of discrete power levels indicative of a power level measured from an uplink communication channel (from a mobile transceiver unit, for example) at the repeater. The BTS 15 may also comprise a processor (64) that is programmed to selectively configure the plurality of discrete power levels at which the repeater will transmit the backhaul signal. The processor may be further programmed to use the control signals or the traffic signals or both to control the power level of the mobile unit 18 based consistent with the plurality of discrete power levels measured on the backhaul signal at the receiver of the base transceiver station. The processor may also be programmed (see FIG. 7) to decrease the power level of the uplink channel if the backhaul signal is transmitting at a first power level (such as −70 dBm), maintain the power level of the uplink channel if the backhaul signal is transmitting at a second power level (such as −80 dBm), increase the power level if the backhaul signal is transmitting at a third power level (such as −90 dBm), and request that the uplink channel handoff to another repeater 12 or BTS 15 if the backhaul signal is transmitting at a fourth power level (such as −100 dBm). Using only 4 discrete uplink levels on a time slot by time slot basis rather than a continuum of power levels simplifies installation and calibration of such repeater stations.

Operationally, the BTS 15 measures the uplink channel from the repeater 12 and after programmable averaging, determines whether to change a mobile unit's 18 power or whether to handover the mobile 18 by comparing the average received power from a mobile 18 to a set of thresholds that are either downloaded from a base station controller 17 (see FIG. 1) or stored locally at the BTS. Preferably, these threshold settings will conveniently fit between the different predetermined power levels of the backhaul signals. For example, the upper level threshold setting for power control decrease based on the uplink receive level could be set at −75 dBm while the lower level threshold setting for power control increase based on the uplink receive level could be set at −85 dBm. The lower level threshold for a handover request based on the uplink receive level can be set at −95 dBm. These three threshold settings respectfully fit between the first through fourth power levels of −70, −80, −90, and −100 dBm as measure at the BTS 15 receiver. This example provides robust margins of 10 dBm for accurate and simplified installations of repeaters 12.

Figure 4:
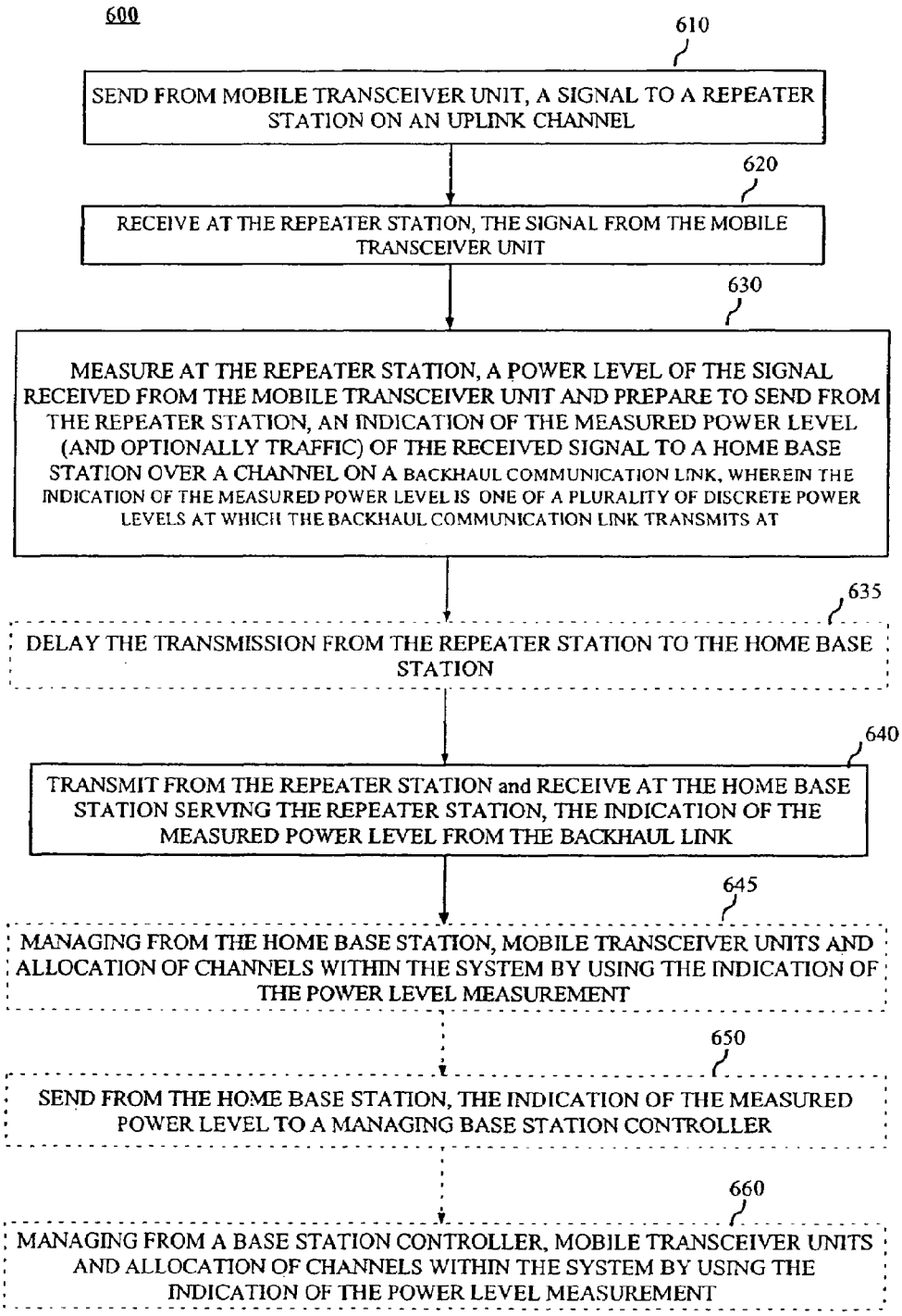
FIG. 4 is a flow chart illustrating a method of managing a plurality of mobile transceiver units in accordance with the present invention.

FIG. 4 is a flowchart illustrating a method for automatically controlling power levels in a backhaul channel of a wireless communication repeater system. In step 610, a signal from a mobile unit 18, is transmitted on an uplink channel 20. This signal is then received at a serving repeater 12, as shown in step 620.

The power level of the signal received from the mobile unit 18 is measured at the repeater 12 as shown in step 630. The repeater 12 adjusts its transmitter power output on the backhaul channel in discrete steps which correlate to certain predetermined ranges of input signals. This process is performed on a time-slot by time-slot basis as the received signal is re-transmitted to the BTS 15 on backhaul communication link 19. The method can optionally include the step 635 of delaying the signal containing the amplitude information for a predetermined amount of time. For example, in a Time Division Multiple Access (TDMA) communication system, the repeater station 12 would preferably delay the amplitude information for one frame so that a burst can be sent back to the BTS from the repeater station at precisely one power level.

In step 640, this signal from the backhaul communication link 19 is then received at a serving home base station, for example, BTS 15. The home BTS 15, on receipt of the backhaul signal, can measure the received power level and determine a corresponding range of possible input signal levels received by the repeater 12 from the mobile units 18. In one alternative embodiment, the BTS 15 can use this indication of the received power level to more efficiently manage the mobile units 18 and to better allocate channels within the system as shown in step 645. Alternatively, selected information concerning the mobile unit signal strength can be provided to a managing base station controller 17 as shown in step 650. The managing base station controller 17 can then use this indication of the received power level to more efficiently manage the mobile units 18 and to better allocate channels within the system. This is illustrated in step 660. It should be understood, that the signal received at the home BTS 15 at step 640 does not necessarily need to be decoded or demodulated for purposes of the present invention. Again, the BTS 15 can merely measure the received power level and determine a corresponding range of possible input signal levels received by the repeater 12 from the mobile units.

It should also be understood that step 630 can be performed in any suitable manner using hardware, software or a combination thereof which permits the repeater to select discrete output power levels for the backhaul channel which correspond to a selected range of power levels received from the mobile units 18.

Figure 5:
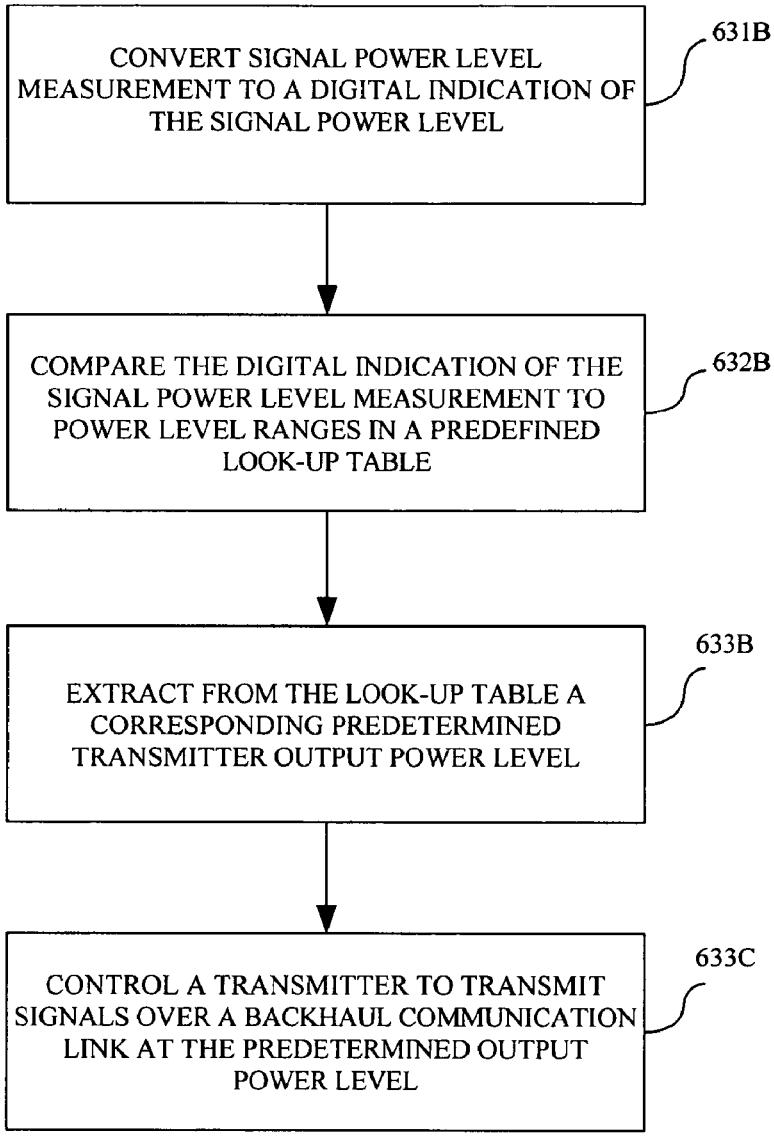
FIG. 5 is a flow chart illustrating a method of controlling a power level in a backhaul communications link in accordance with the present invention.

In accordance with the invention and with reference to the exemplary repeater 12, as illustrated in FIG. 2, step 630 is now described in detail. With reference to FIG. 4, the flowchart illustrates a method for selectively controlling the output power level on a backhaul communication link 19. The power level of the signal received from a mobile unit 18 is measured by control processor 46 through the use of algorithms that are well known in the art. Control processor 46 can convert the result of the algorithm to a digital representation as shown in step 631B of method 700 shown in FIG. 5.

Under the control of processor 46, the repeater 12 can maintain a lookup table corresponding to a range of possible values that can be returned from the measurement algorithm along with a corresponding output power level that is required to control the transmitter for the backhaul communication link 19 for each of the ranges. The lookup table may be stored in non-volatile memory for permanent storage. Alternatively, the lookup table may be stored in non-volatile memory, such as static RAM, where the corresponding output power level for transmission on the backhaul communication link can be continuously updated depending on the conditions that exist on the uplink channel of the backhaul communication link Under control by processor 46, the repeater 12 may consult the predefined lookup table stored in memory and compare the digital indication of the signal power level measurement to the predefined ranges to determine the range in which the digital indication of the signal power level falls. This is shown in step 632B. Once the range is determined, the control processor 46 can then extract from the lookup table stored in memory, the corresponding predetermined output power that the transmitter should transmit at on the backhaul communication link 19. This is illustrated in step 633B. Once the predetermined output power level is determined by processor 46, processor 46 can then send instructions to the backhaul transceiver to transmit signals over the uplink channel of the backhaul communication link at the specified power. This is shown in step 633C. Note that the signals transmitted at the specified power on the backhaul communication link is not necessarily limited to a traffic channel, a control channel, or a combination thereof. Note also that the processor 46 can optionally include instructions to the backhaul transceiver to delay transmissions. This is quite useful in a TDMA system where power control and handover operations are executed at frequency less than frame by frame. Thus, the power control and handover operations will suffer no impact if the repeater station delays received power level information for a particular channel by one frame. The delay allows the repeater to deterministically determine the averaged received power level of burst M as it occurred on frame N. Then at frame N+1, the new information of burst M can be translated at precisely one and only one discrete power level amplitude that corresponds to the received and average power level of burst M on frame N. The entire burst is rebroadcast at this discrete power level. This delay concept can be extended to non-TDMA systems by averaging the received signal at the repeater station for some determined time period and then using the power results of that time period for the next time period.

With reference to FIG. 6, and in accordance with the scope and spirit of the invention, an exemplary lookup table is illustrated. The table described herein is intended for illustrative purposes and therefore, it is not intended to limit the invention in any manner. The following example illustrates how the power level on the backhaul communication link is controlled using the exemplary lookup table. Please note that FIG. 6 provides greater granularity than is really necessary to implement the present invention.

After running the power level measurement algorithm and using the thresholds of FIG. 6, processor 46 gets a digital indication of the power level measurement that is equivalent to −68 dBm. Processor 46 would then access the lookup table stored in memory as a suitable data structure and find the appropriate range within which the measurement falls. For −68 dBm, the range is −66 dBm to −75 dBm. Once processor 46 locates the appropriate input power range, it would then extract the corresponding predetermined output power level of −70 dBm. Processor 46 can then send an instruction the backhaul transceiver to transmit signals over the uplink channel of the backhaul communication link at a power level of −70 dBm.

In accordance with the spirit and scope of the invention and with reference to the exemplary BTS 15 as illustrated in FIG. 3, steps 640 and 650 of FIG. 4 are now described in detail. A multichannel signal from the backhaul communication link bearing the channel with measured power level from mobile unit 18 can be received at antennas 68,70 and processed by receiver 56. A wideband receiver 51 processes the multichannel signal and extracts the individual narrowband channels contained in the signal. Each narrowband signal is coupled to one of N respective DSP receiver processing unit 63-1 to 63-2N. Each carrier signal is demodulated and the necessary error correction scheme performed on the demodulated information. Error correction schemes, such as Forward Error Correction (FEC), are well known in the art. For example, U.S. Pat. No. 5,896,391 to Solheim et al, titled "Forward Error Correction Assisted Receiver Optimization," describes a FEC methodology. The resulting contents of each channel can then be stored in memory within the DSP 63. The channel containing the power level information would then be stored in the memory associated with DSP's 63-1.

Alternatively, under the control of CPU 64, the contents of each channel can be stored in the shared memory 75 via the common bus 61, thereby giving other peripherals access to the stored information. The CPU 64 can then access the shared memory 75 and manipulate the information for each channel. In this case, the power level indication would be stored in the shared memory 75. Once the channel containing the indication of the measured power level is demodulated and stored in memory, this information may be transferred to the associated memory of DSP 69 for transmission to the managing base station controller (BSC), for example, BSC 17. The BSC 17 would then appropriately instruct the BTS 50 to send a control signal to the mobile unit 18 to decrease power, maintain power, boost power, or prepare for handoff to another BTS 15 or possibly to another repeater 12. Alternatively, as illustrated in step 645 of FIG. 4, the BTS 15 itself could control the power and allocate channels for the mobile units 18 based on the discrete power levels received at the BTS 15 from the corresponding repeater 12 in accordance with the present invention.

FIG. 7 is another exemplary lookup table in accordance with the present invention. Ideally, the mobile transceiver units will have a measured power at the repeater 12 of approximately −70 dBm (corresponding to a predetermined output level from the repeater station of −80 dBm). In one embodiment of the present invention, the mobile unit 18 is controlled by either the BTS 15 or the BSC 17 to maintain this ideal mobile uplink power. Of course, it should be understood that the ideal mobile uplink power could be programmed to be any appropriate level and −70 dBm is provided here for illustrative purposes. After running the power level measurement algorithm as previously described, processor 46 gets a digital indication of the power level measurement that is equivalent to measured input power. Based on the measured input power and the predetermined output power level received at the BTS 15, the BTS 15 or BSC 17 will accordingly instruct the mobile unit 18 to either lower power, maintain power, boost power, or prepare for handoff. In this case where the repeater 12 measures −99 dBm, processor 46 would then access the lookup table stored in memory as a suitable data structure and find the appropriate range within which the measurement falls within the range of −75 to −105 dBM. Once processor 46 locates the appropriate input power range, it would then extract the corresponding predetermined output power level of −90 dBm. Processor 46 can then send an instruction to the backhaul transceiver to transmit signals over the uplink channel of the backhaul communication link to the BTS 15 at a power level of −90 dBm. This would indicate to the BTS 15 or BSC 17 to respond with an instruction to the mobile unit 18 to boost power in order to maintain the ideal mobile uplink power. As FIG. 7 indicates, the BTS 15 preferably receives the backhaul signal at one of four discrete power levels and correspondingly transmits instructions to the mobile unit 18 to decrease power, maintain power, boost power, or prepare for hand off to another BTS 15 or repeater 12.

Although the foregoing invention has been described in some detail by way of illustration and example for purposes of clarity and understanding, it should be apparent to those of ordinary skill in the art in light of the teaching of this invention that certain changes and modifications may be made thereto without departing from the scope or spirit of the claims.

What is claimed is:

1. In a wireless cellular communication system having a base transceiver station located within a home cell and at least one substantially adjacent cell having a repeater located therein, a method for managing a plurality of mobile transceiver units, comprising the steps of:

receiving at said repeater a signal from a mobile transceiver unit on an uplink communication channel;

measuring at said repeater a power level of said signal as received by said repeater; and transmitting a backhaul signal from said repeater to said base transceiver station on a backhaul communication link, wherein said backhaul signal is selectively transmitted at one of a plurality of discrete power levels, each of said discrete power levels representing a coded indication of said power level as measured by said repeater.

2. The method according to claim 1 wherein said backhaul signal is comprised of at least a traffic portion of said signal received from said mobile transceiver unit.

3. The method according to claim 1, wherein said selectively transmitting step further comprises the steps of:

generating power level data which is a digital representation of said power level as measured at said repeater;

correlating said power level data to a predetermined transmitter power level associated with said power level; and controlling a transmitter of said repeater to transmit at said predetermined transmitter power level.

4. The method according to claim 3, wherein said base transceiver station (BTS) assigns channels in said wireless communication system based on said indication of said power level.

5. The method according to claim 3, wherein a base station controller (BSC) coupled to the base transceiver station assigns channels in said wireless communication system based on said indication of said power level.

6. The method according to claim 1, wherein the step of selectively transmitting further comprises the step of selecting from among four discrete power levels to provide an indication if the power level as measured by the repeater is too high, in range, below range, or requiring handoff.

7. The method of claim 6, wherein the method further comprises the step of receiving the backhaul signal at one of four discrete power levels at said base transceiver station and correspondingly transmitting instructions to the mobile transceiver unit to decrease power, maintain power, boost power, or prepare for hand off to another base transceiver station or repeater.

8. The method according to claim 1 wherein the method further comprises the step of delaying the step of transmitting the backhaul signal by a predetermined amount of time.

9. A repeater in a wireless cellular communication system having a base transceiver station located within a home cell and a plurality of substantially adjacent cells at least one having said repeater located therein, said repeater comprising:

a receiver for receiving at one of said repeaters a signal from a mobile transceiver unit via an uplink communication channel;

power measurement means for measuring at said repeater a power level of said signal as received by said repeater; and a transmitter for transmitting a backhaul signal from said repeater to said base transceiver station via a backhaul communication link, wherein said backhaul signal is transmitted at one of a plurality of discrete power levels selected in accordance with a predetermined coding scheme for providing an indication of said power level from the mobile transceiver as measured by said repeater.

10. The repeater according to claim 9, wherein said backhaul signal comprises at least a traffic portion of said signal received from said mobile transceiver unit.

11. The repeater according to claim 10, wherein the plurality of discrete power levels providing an indication of said power level as measured by said repeater are four discrete power levels to provide an indication if the power level as measured by the repeater is too high, in range, below range, or requiring handoff to another repeater or base transceiver station.

12. In a wireless cellular communication system having a base transceiver station located within a home cell, and a plurality of substantially adjacent cells, with at least one having a repeater located therein, a method for automatically controlling power level in a backhaul communication link, said link having at least one channel, the method comprising:

receiving at said repeater a signal from an uplink channel;

measuring at said repeater a signal power level of said signal as received by said repeater;

transmitting a backhaul signal from said repeater to said base transceiver station, wherein said backhaul signal comprises at least a traffic portion of said signal received from the uplink channel which is transmitted at one of a plurality of discrete power levels providing an indication of said signal power level as measured by said repeater;

receiving at a base transceiver station said indication of said signal power level and said at least a traffic portion of said signal; and assigning channels in said wireless communication system at said base station, based on said signal power level.

13. The method of claim 12, wherein said signal from an uplink channel received at one of said repeaters is from a mobile transceiver signal.

14. The method of claim 12, wherein said signal from an uplink channel received at one of said repeaters is from a pilot signal.

15. The method according to claim 12, wherein the method further comprises the step of delaying the step of transmitting the backhaul signal by at least one frame.

16. A configurable base transceiver station in a communication system having the base transceiver station located within a home cell and a plurality of substantially adjacent cells, with at least one of said adjacent cells having a repeater located therein, said base transceiver station comprising:

a transmitter for transmitting traffic and control signals to the repeater;

a receiver for receiving a backhaul signal from the repeater, wherein the backhaul signal is transmitted at one of a plurality of discrete power levels indicative of a power level measured from an uplink communication channel at the repeater; and a processor that is programmed to selectively configure the plurality of discrete power levels at which the repeater will transmit the backhaul signal, wherein the processor is further programmed to decrease the power level of the uplink channel if the backhaul signal is transmitting at a first power level, maintain the power level of the uplink channel if the backhaul signal is transmitting at a second power level, increase the power level if the backhaul signal is transmitting at a third power level, and request that the uplink channel handoff to another repeater or base transceiver station if the backhaul signal is transmitting at a fourth power level.

*17. A configurable base transceiver station comprising:*

*a transmitter configured to transmit traffic and control signals to a repeater;*

*a receiver configured to receive a backhaul signal from the repeater, wherein the backhaul signal is transmitted at one of a plurality of discrete power levels, the one of the plurality of discrete power levels representing a coded indication of a power level as measured from an uplink communication channel at the repeater; and*

*a processor that is programmed to selectively configure the plurality of discrete power levels at which the repeater is transmitting the backhaul signal.*

*18. The configurable base transceiver station of claim 17, wherein the uplink communication channel is a channel containing signals from a mobile transceiver unit.*

*19. The configurable base transceiver station of claim 18, wherein the processor is further programmed to process the coded indication of the power level to control a power level of the mobile transceiver unit based on the coded indication of the power level.*

*20. A method for managing a plurality of mobile transceiver units comprising:*

*receiving at a repeater a signal on an uplink communication channel;*

*measuring at the repeater a power level of the signal as received by the repeater; and*

*transmitting a backhaul signal from the repeater to the base transceiver station on a backhaul communication link, wherein the backhaul signal is selectively transmitted at one of a plurality of discrete power levels, the one of the plurality of discrete power levels representing a coded indication of the measured power level.*

*21. The method according to claim 20, wherein the backhaul signal is comprised of at least a traffic portion of the signal received from the mobile transceiver unit.*

*22. The method according to claim 20, wherein the selectively transmitting comprises:*

*generating power level data which is a digital representation of the measured power level;*

*correlating the measured power level data to a predetermined transmitter power level associated with the measured power level; and*

*controlling a transmitter of the repeater to transmit at the predetermined transmitter power level.*

*23. The method according to claim 22, further comprising assigning channels, by a base transceiver station (BTS), in a wireless communication system based on the coded indication of the measured power level.*

*24. The method according to claim 22, wherein a base station controller (BSC) coupled to the BTS assigns channels in the wireless communication system based on the coded indication of the measured power level.*

*25. The method according to claim 20, wherein the selectively transmitting comprises selecting from four discrete power levels to provide an indication of a plurality of indications, in response to the measured power level, the plurality of indications comprising too high, in range, below range, or requiring handoff.*

*26. The method of claim 25, further comprises receiving the backhaul signal at one of four discrete power levels at the BTS and correspondingly transmitting a selected instruction of a plurality of instructions to the mobile transceiver unit, the plurality of instructions comprising decrease power, maintain power, boost power, or prepare for hand off to another BTS or repeater.*

*27. The method of claim 20, further comprises delaying the transmitting the backhaul signal by a predetermined amount of time.*

*28. A repeater comprising:*

*a receiver configured to receive at the repeater a signal via an uplink communication channel;*

*power measurement means configured to measure at the repeater a power level of the signal received by the repeater; and*

*a transmitter configured to transmit a backhaul signal from the repeater to the base transceiver station via a backhaul communication link, wherein the backhaul signal is transmitted at one of a plurality of discrete power levels selected in accordance with a coding scheme configured to provide an indication of the power level from a mobile transceiver measured by the repeater.*

*29. The repeater of claim 28, wherein the backhaul signal comprises at least a traffic portion of the signal received from the mobile transceiver.*

*30. The repeater of claim 29, wherein the plurality of discrete power levels providing an indication of the power level measured by the repeater comprises four discrete power levels comprising too high, in range, below range, or requiring handoff to another repeater or base transceiver station.*

*31. A method for controlling power level in a backhaul communication link comprising:*

*receiving at a repeater a signal from an uplink channel;*

*measuring at the repeater a signal power level of the signal received by the repeater;*

*transmitting a backhaul signal from the repeater to the base transceiver station, wherein the backhaul signal is transmitted at one of a plurality of discrete power levels providing an indication of the measured signal power level;*

*receiving at a base transceiver station the indication of the measured signal power level; and*

*assigning channels in a wireless communication system at the base transceiver station, based on the signal power level.*

*32. The method of claim 31, wherein the signal from an uplink channel received at the repeater is from a mobile transceiver signal.*

*33. The method of claim 31, wherein the signal from an uplink channel received at the repeater is from a pilot signal.*

*34. The method of claim 31, further comprising delaying the transmitting the backhaul signal by at least one frame.*

*35. A method for automatically controlling power level in a backhaul communication link comprising:*

*receiving at a base transceiver station a backhaul signal transmitted at one of a plurality of discrete power levels,*

*receiving at a repeater a signal from an uplink channel,*

*wherein a power level of the backhaul signal indicates a power level of a signal received by the repeater from the uplink channel, the indication of the signal power level and the at least a traffic portion of the signal; and*

*assigning channels in a wireless communication system at the base transceiver station, based on the signal power level.*

*36. A method comprising:*

*transmitting traffic and control signals to a repeater;*

*receiving a backhaul signal from the repeater, wherein the backhaul signal is transmitted at one of a plurality of*

*discrete power levels indicative of a power level measured from an uplink channel at the repeater;*

*selectively configuring the plurality of discrete power levels at which the repeater will transmit the backhaul signal;*

*programming a processor to decrease the power level of the uplink channel in response to the backhaul signal being transmitting at a first power level;*

*maintaining the power level of the uplink channel in response to the backhaul signal being transmitting at a second power level;*

*increasing the power level in response to the backhaul signal being transmitting at a third power level; and*

*request the handoff of the uplink channel to another repeater or base transceiver station in response to the backhaul signal being transmitting at a fourth power level.*

*37. A wireless cellular communication system comprising:*

*a base transceiver station located within a home cell;*

*a plurality of substantially adjacent cells, wherein at least one of the plurality of substantially adjacent cells comprising a repeater located therein,*

*wherein the repeater is operatively connected to the base transceiver station by a backhaul communication link comprising at least one channel,*

*wherein the repeater is configured to measure a signal power level of a plurality of signals received by the repeater from an uplink channel and transmits a backhaul signal from the repeater to the base transceiver station, the backhaul signal being transmitted at one of a plurality of discrete power levels providing an indication of the signal power level measured by the repeater, and*

*wherein the base transceiver station is configured to assign channels at the base station, based on the signal power level.*

*38. The system of claim 37, wherein the plurality of signals from the uplink channel received at the repeater are from a plurality of mobile transceivers.*

*39. The system of claim 37, wherein the plurality of signals from the uplink channel received at the repeaters are pilot signals.*

*40. The system according to claim 37, wherein the transmission of the backhaul signal is delayed by at least one frame.*

* * * * *

UNITED STATES PATENT AND TRADEMARK OFFICE

CERTIFICATE OF CORRECTION

PATENT NO. : RE44,357 E
APPLICATION NO. : 12/058381
DATED : July 9, 2013
INVENTOR(S) : Schmutz It is certified that error appears in the above-identified patent and that said Letters Patent is hereby corrected as shown below:

In the Drawings:

In Fig. 1, Sheet 1 of 6, delete "

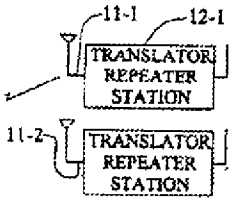

" and insert --

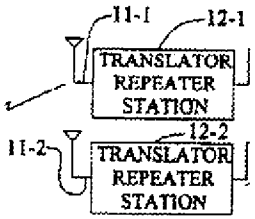

--, therefor.

In the Specification:

In Column 2, Line 47, delete "repeater" and insert -- repeater. --, therefor.

In Column 4, Line 48, delete "down-convert," and insert -- downconvert, --, therefor.

In Column 5, Line 60, delete ""wide-band"" and insert -- "wideband" --, therefor.

In Column 9, Line 2, delete "link" and insert -- link. --, therefor.

Signed and Sealed this
Twenty-seventh Day of May, 2014

Michelle K. Lee

Michelle K. Lee
*Deputy Director of the United States Patent and Trademark Office*